US006938889B2

(12) United States Patent
Chuang

(10) Patent No.: US 6,938,889 B2
(45) Date of Patent: Sep. 6, 2005

(54) SHOCK ABSORBING AND MAGNETIC LEVITATING CUSHION

(76) Inventor: Pao-An Chuang, 12F-2, No. 376, Tun Hwa South Rd., Sec. 1, Taipei (TW)

( * ) Notice: Subject to any disclaimer, the term of this patent is extended or adjusted under 35 U.S.C. 154(b) by 0 days.

(21) Appl. No.: 10/684,674

(22) Filed: Oct. 15, 2003

(65) Prior Publication Data

US 2005/0082447 A1 Apr. 21, 2005

(51) Int. Cl.[7] ................................................ F16F 15/03
(52) U.S. Cl. .................. 267/140.15; 188/267; 267/136
(58) Field of Search ........................ 188/267, 161–165, 188/378–380; 267/140.15, 136; 248/550, 248/636, 562, 638; 310/90.5, 51, 12; 5/906, 5/693; 361/146–147; 360/137; 318/128

(56) References Cited

U.S. PATENT DOCUMENTS

| | | | | |
|---|---|---|---|---|
| 4,432,441 A * | 2/1984 | Kurokawa | .................. | 188/267 |
| 5,231,336 A * | 7/1993 | van Namen | ................ | 318/128 |
| 5,726,512 A * | 3/1998 | Chu et al. | .................. | 310/90.5 |
| 6,448,679 B1 * | 9/2002 | Imlach | ...................... | 310/90.5 |
| 6,588,554 B2 * | 7/2003 | Fujita et al. | ................ | 188/267 |

FOREIGN PATENT DOCUMENTS

| | | |
|---|---|---|
| JP | 9-268799 | * 10/1997 |
| JP | 2001-165239 | * 6/2001 |

OTHER PUBLICATIONS

STIC translation of JP2001-165239A.*

* cited by examiner

*Primary Examiner*—Douglas C. Butler
(74) *Attorney, Agent, or Firm*—Troxell Law Office, PLLC

(57) ABSTRACT

A shock absorbing and magnetic levitating cushion used as a supporting pedestal for an audio-video equipment, the cushion including a housing, two mutually excluded annular magnets, a magnetic conductive member and a cover. The housing has two annular magnets mutually excluded and opposite to each other, and has a magnetic conductive member filled with material of high specific weight. The housing is covered with a cover. According to the principle of mutual exclusion between two poles of two magnets of identical polarity, the two annular magnets undergo a magnetic-levitating phenomenon and are provided therebetween with a space for movement, and the magnetic levitating cushion gets an effect of shock isolation and shock absorbing.

5 Claims, 5 Drawing Sheets

SHOCK ABSORBING AND MAGNETIC LEVITATING CUSHION

BACKGROUND OF THE INVENTION

1. Field of the Invention

The present invention is related to a shock absorbing and magnetic levitating cushion, and especially to levitation formed by two mutually excluding annular magnets for shock absorbing, the present invention is particularly suitable for use for shock isolation and shock absorbing, and to be used as a supporting pedestal for an audio-video equipment.

2. Description of the Prior Art

The living standards of the people in the world are continuously elevated, people think more and more highly of the life of leisure and the quality of life. The fond of enjoyment of audio-video amusements of people are extremely eager as to have specific spaces for audio-video amusements in their homes in order to enjoy acoustic and optic appreciations of as those used to be provided only in the highest class for a national music hall. While audio-video equipment for providing audio-video amusements can not only give the viewers/listeners the images of clear pictures to satisfy acoustic and optic feelings, but to provide necessary emergence of sounds; it is always the goal of the manufacturers of the art to satisfy acoustic feeling of listeners in enjoying natural as well as clear sounds.

It is well known that Hi-fi equipment is afraid of vibration that can affect quality of Hi-fi's. The sources of vibration that can influence Hi-fi equipment include a driving electric motor, magnetic inductance of a transformer as well as sound waves from heavy-sound playing of a loud speaker; in order to avoid such influences of vibration to Hi-fi equipment, the equipment are added on their own with measures of shock isolation and shock absorption, and therefore various shock absorbing devices are developed. But viewers/listeners generally pay much money for decoration. For example, they use imported wooden plates for a floor, and lay carpets to help absorbing sound, further, they use fireproof mineral fibrous slabs with caissons for a ceiling, or use hard pyramidal footing nails and soft shock absorbing pads etc. to improve resonance vibration and sound absorbing, in order to reduce the influences of the vibrations of the interior and exterior regions of a Hi-fi equipment to obtain higher quality of sounds.

Under this condition, if an audio-video equipment of the best class has no better peripheral equipment to cooperate therewith, but is simply placed on a fixed cabinet or some other seats that are not able to eliminate a vibration source created by the audio-video equipment, thus, harmonic waves of the sounds will be distorted, and qualities of the sounds will not be mellow and thick. The expensive Hi-fi equipment will lose its proper effect, and the money paid for it is surely wasted.

In view of the above defects to be gotten rid of, the present invention is developed.

SUMMARY OF THE INVENTION

The primary object of the present invention is to provide a shock absorbing and magnetic levitating cushion. By providing a magnetic conductive member and shock absorbing material for the magnetic audio-video equipment to make sound transmission of the audio-video equipment become more natural, limpid and clear, and thereby qualities of sounds will be mellow and thick.

To achieve the object, a shock absorbing and magnetic levitating cushion of the present invention comprises a housing, two mutually excluding annular magnets, a magnetic conductive member and a cover. The housing has an opening on one end thereof, an engaging portion is provided on the outer rim of the opening; and said housing has a protrusion on the outer surface of the other end thereof, and a hollow column extending upwardly set at the middle of the inner surface of the other end thereof to form two receiving spaces therein the housing. The two mutually excluding annular magnets are slipped over the hollow column of the housing, and are received in the housing. The magnetic conductive member in the form of a sheet, from which a hollow post is axially and integrally provided at the center thereof, the hollow post is inserted into the hollow column of the housing, one side of the sheet is exactly coincident with and clings to one side of one of the magnets. The cover has a rim with a thickness, the rim of the cover is provided on the inner side thereof near the opening of the cover with a plurality of inverse hooks, so that when the cover covering the housing is opened, the inverse hooks are hindered by the engaging portion of the housing, and it is hard to open the cover. Thereby, in accordance with the principle of mutual excluding between two poles of two magnets of identical polarity, the above stated two annular magnets get therebetween a magnetic levitating phenomenon and are provided therebetween with a space for movement, and hence the shock absorbing and magnetic levitating cushion can get an effect of shock absorbing.

The present invention will be apparent after reading the detailed description of the preferred embodiment thereof in reference to the accompanying drawings.

DETAILED DESCRIPTION OF THE PREFERRED EMBODIMENT

Figure 1:
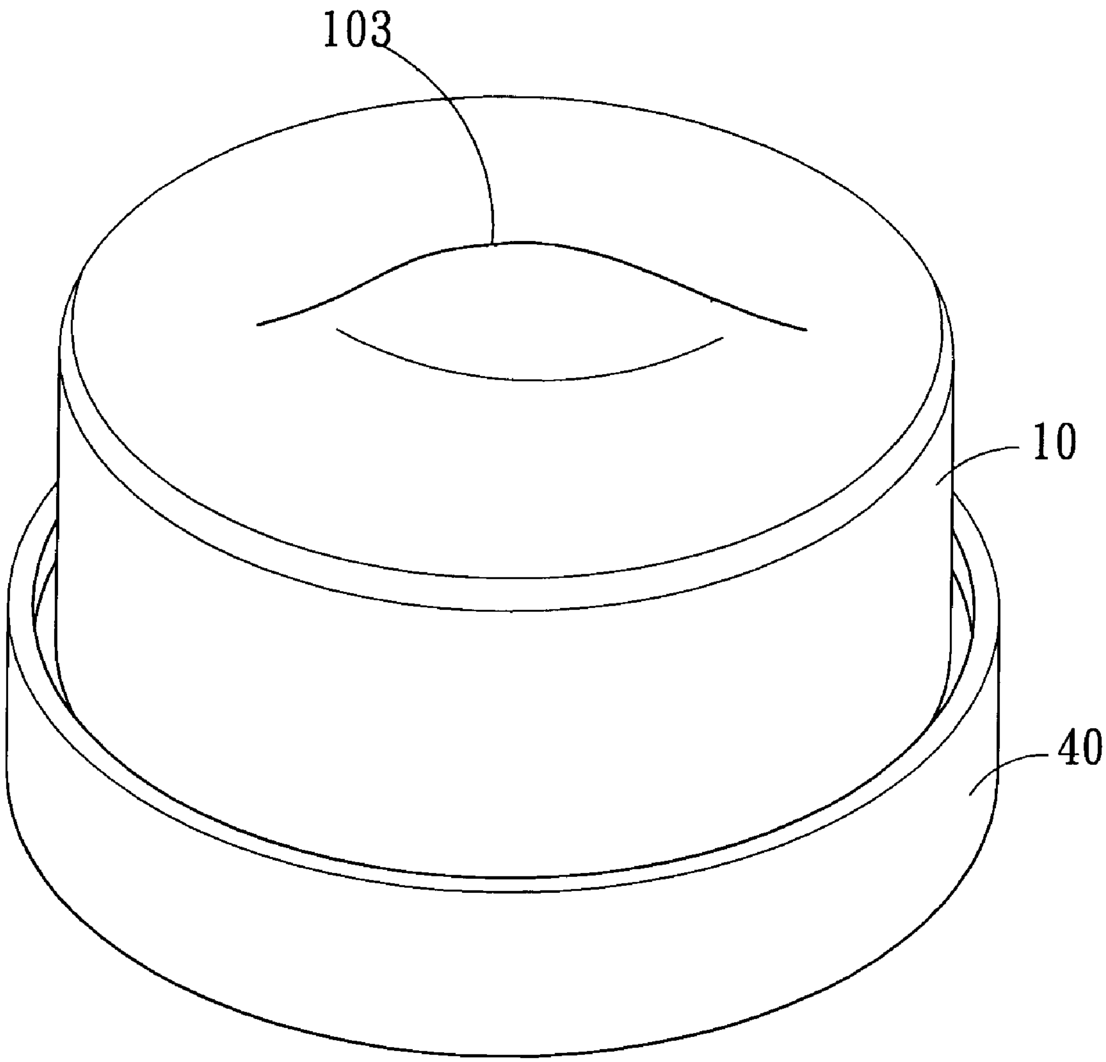
FIG. 1 is a perspective view showing the appearance of a shock absorbing and magnetic levitating cushion of the present invention.
Figure 2:
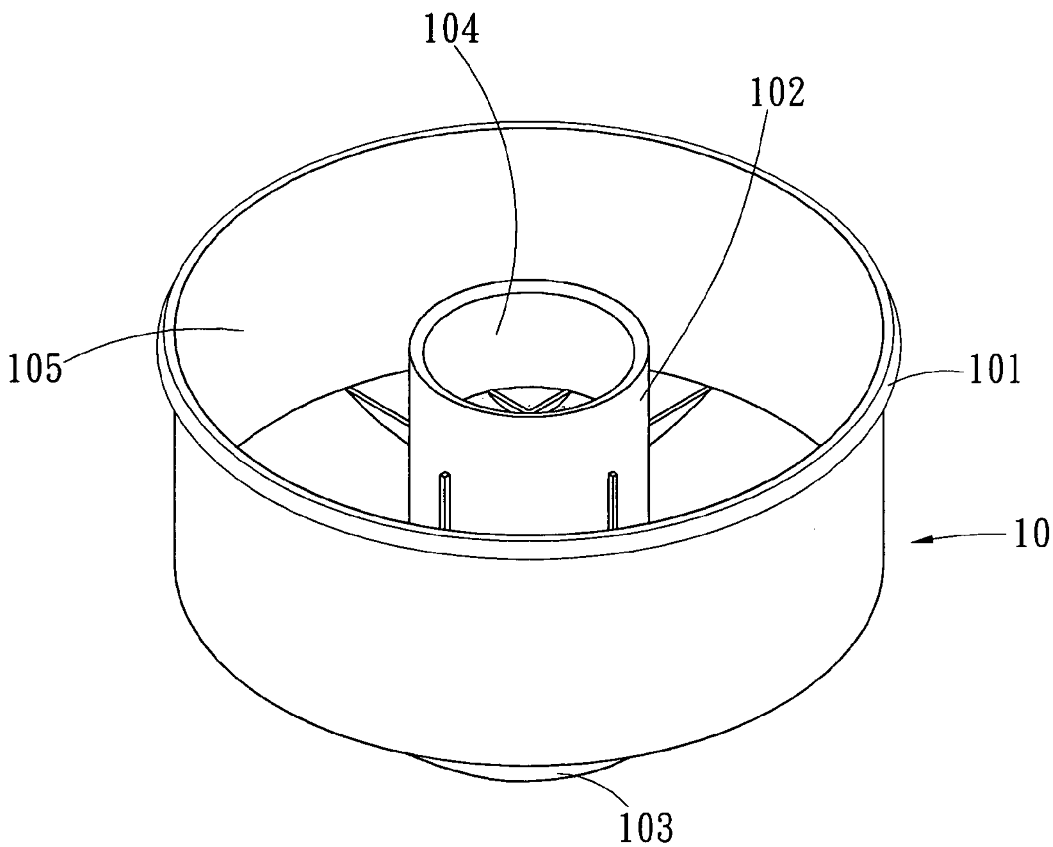
FIG. 2 is a perspective view showing the interior of a housing of the shock absorbing and magnetic levitating cushion of the present invention.
Figure 3:
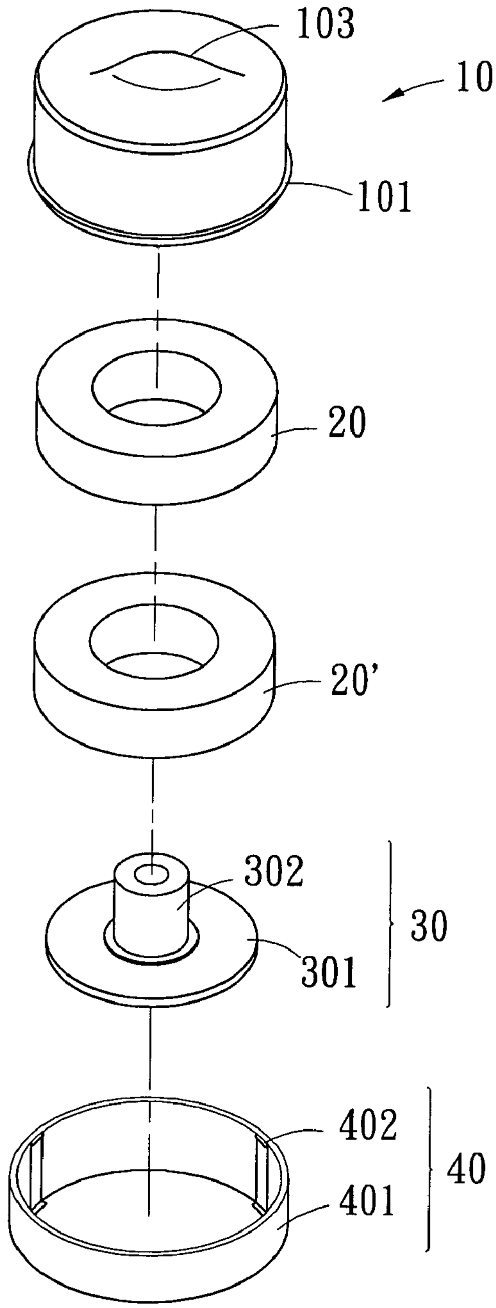
FIG. 3 is an exploded perspective view showing the members the shock absorbing and magnetic levitating cushion of the present invention.
Figure 4:
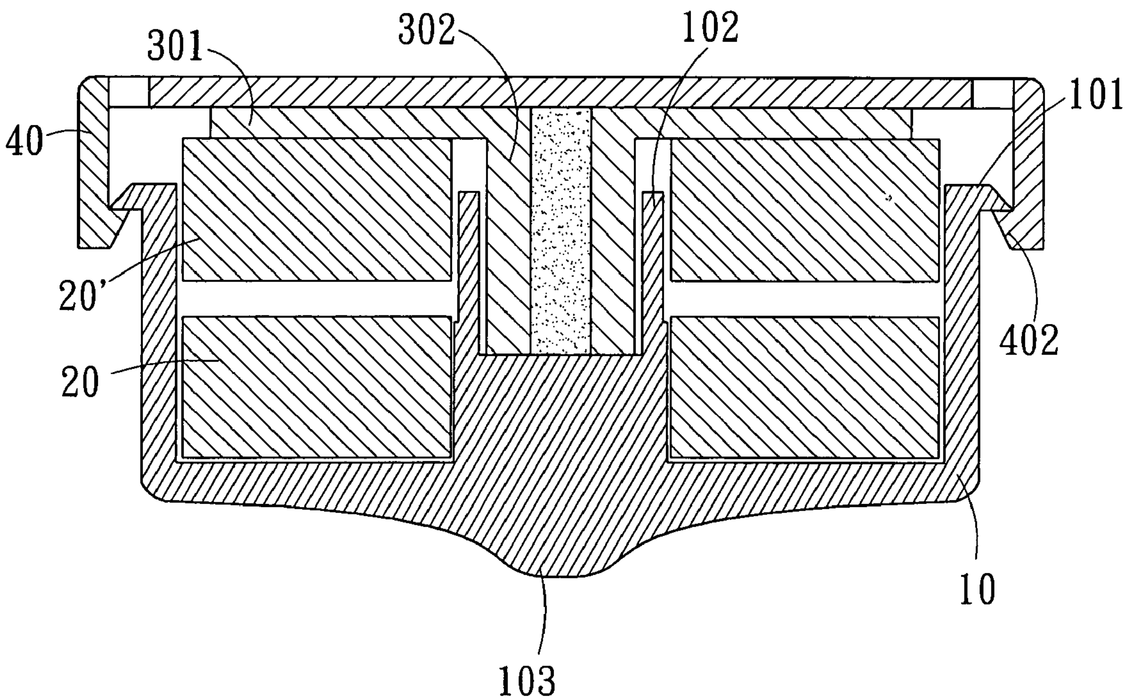
FIG. 4 is a sectional view showing perspective view showing the appearance of the shock absorbing and magnetic levitating cushion of the present invention.

Referring to FIGS. 1–5, the shock absorbing and magnetic levitating cushion of the present invention comprises a housing 10, two mutually excluding annular magnets 20, 20', a magnetic conductive member 30 and a cover 40.

The housing 10 is cylindrical, has an opening on one end thereof, on the outer rim of the opening is provided with an engaging portion 101; and the housing 10 has on the outer surface of the other end thereof a protrusion 103, and further has a hollow column 102 extending upwardly at the middle of the inner surface thereof the other end to form two receiving spaces 104, 105 therein the housing 10.

The two mutually excluding annular magnets 20, 20' both are cylindrical, arranged mutually excluded opposite to each other, and are slipped over the hollow column 102 of the housing 10 and have been received in the receiving space 105.

The magnetic conductive member 30 is in the form of a sheet 301, from which a hollow post 302 is axially and integrally provided at the center thereof, the hollow post 302 is inserted into the receiving space 104 in the hollow column 102 of the housing 10; one side of the sheet 301 is exactly coincident with and clings to one side of the magnet 20'.

The cover 40 has a rim 401 with a thickness, the rim 401 is provided on the inner side thereof near the opening of the cover 40 with a plurality of inverse hooks 402, the cover 40 is made of plastic that is slightly elastic, so that when the cover 40 covering the housing 10 is opened, the inverse hooks 402 are hindered by the engaging portion 101 of the housing 10, and to open the cover 40 is hard.

When assembling the present invention, in the first place, the two mutually excluding annular magnets 20, 20' are arranged to make two magnetic poles of identical polarity opposite to each other and thereby mutually excluded; for example, the south pole of one of them is opposite to the south pole of the other, and they are slipped in the hollow column 102 of the housing 10, then the hollow post 302 of the magnetic conductive member 30 is inserted into the hollow column 102 of the housing 10 to make the sheet 301 of the magnetic conductive member 30 cling to one side of the magnet 20', and then have the material with the function of shock absorbing fill in the hollow post 302 to enhance the effect of shock absorbing of the shock absorbing and magnetic levitating cushion; and lastly, the cover 40 which is cylindrical is used to cover, the inverse hooks 402 of the cover 40 and the engaging portion 101 of the housing 10 are engaged with each other, thereby, the mutual excluding force between the two annular magnets 20, 20' levitates the cover 40 relative to the housing 10, a space for movement of the cover 40 and with a moving range equal to the height of the rim 401 is provided between the cover 40 and the housing 10; and by engagement of the inverse hooks 402 with the engaging portion 101, the cover 40 is hard to open. In this way, assembling of the shock absorbing and magnetic levitating cushion is completed. And more, in order to make the present invention more stable when in use, the rear end of the housing 10 is provided on the outer surface of the other end thereof with a protrusion 103 which is filled therein with material of high specific weight.

Figure 5:
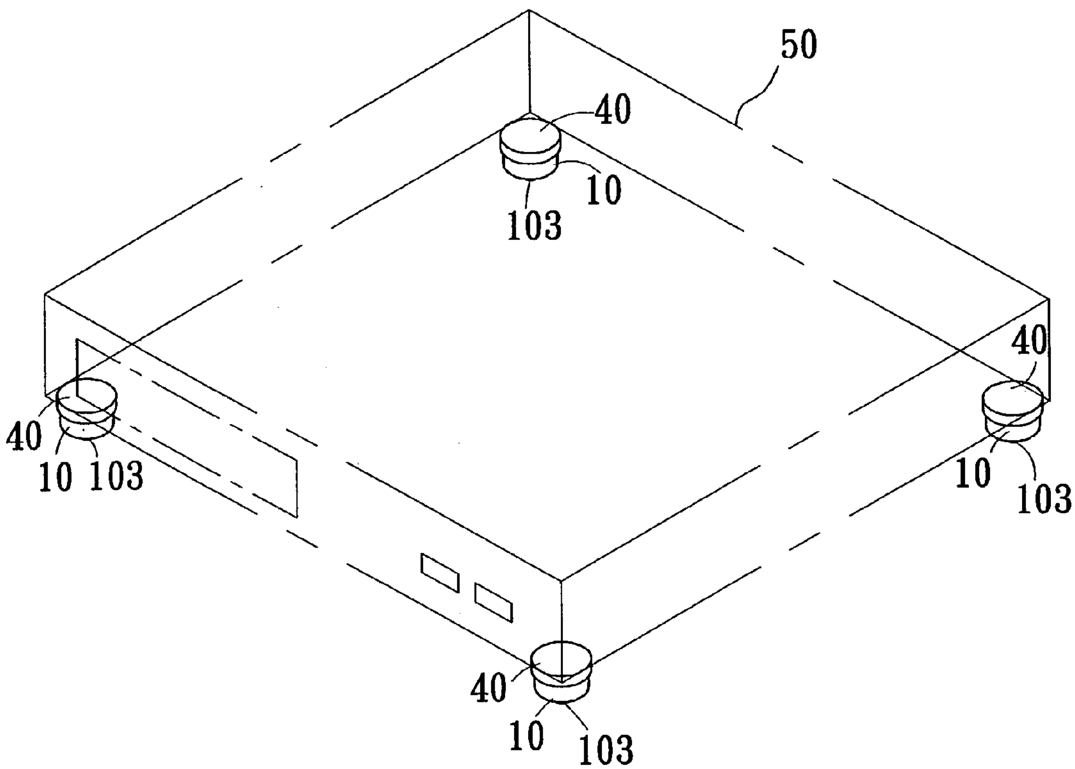
FIG. 5 is a perspective schematic view showing application of a plurality of shock absorbing and magnetic levitating cushions of the present invention.

When practicing, it needs only to place an audio-video equipment 50 such as a DVD on the shock absorbing and magnetic levitating cushion, as shown in FIG. 5; and then by the magnetic-levitating phenomenon created between the two annular magnets 20, 20' because of the principle of mutual excluding between two poles of two magnets of identical polarity, the cover 40 and the housing 10 are provided therebetween with the space for movement, and material of shock absorbing is filled in the hollow post 302, the effect of shock isolation and shock absorption can thus be achieved.

Thereby the present invention has the following advantages:

1. It takes advantage of the magnetic-levitating phenomenon according to the principle of mutual excluding between two poles of two magnets of identical polarity to isolate vibrations outside of a machine to get a good effect of shock absorbing.

2. It further uses a magnetic conductive member filled therein with shock absorbing material to absorb vibrations generated by a transformer in a CD player or DVD or by rotation of a motor, this can get more perfect effect of shock absorbing.

3. A protrusion is provided on the surface of the bottom side of the housing, thereby, when the present invention is used on an uneven ground, the two magnets can be kept parallel with each other, so that the magnetic levitation created by mutual excluding can be kept in the best effective state.

4. The housing is filled therein with material of high specific weight, so that when the present invention is used as a pedestal, it can be more stable.

5. The present invention is structurally simple, and can be easily assembled; thereby its cost of production is low.

The above stated is only an embodiment for illustrating the present invention, and not for giving any limitation to the scope of the present invention. It will be apparent to those skilled in this art that various modifications or changes without departing from the spirit of this invention shall also fall within the scope of the appended claims.

In conclusion, According to the above statement, the present invention can get the expected objects thereof to provide a shock absorbing and magnetic levitating cushion-pad which is industrially valuable. Having thus described my invention, what I claim as new and desire to be secured by Letters Patent of the United States are:

What is claimed is:

1. A shock absorbing and magnetic levitating cushion used as a supporting pedestal for an audio-video equipment, said cushion comprises:

a housing having an opening on a first end thereof, an engaging portion is provided on an outer rim of said opening; and said housing has a protrusion on an outer surface of a second end thereof, said second end has at a middle of an inner surface a hollow column extending upwardly to form two receiving spaces in said housing;

two mutually excluding annular magnets slipped over said hollow column of said housing, and received in said housing;

a magnetic conductive member in the form of a sheet, from which a hollow post is axially and integrally provided at the center thereof, said hollow post is inserted into said hollow column of said housing, one side of said sheet is coincident with and clings to one side of one of said magnets; and a cover having a rim with a thickness, said rim of said cover is provided on an inner side thereof near an opening of said cover with a plurality of inverse hooks, so that when said cover covering said housing is opened, said inverse hooks are hindered by said engaging portion of said housing;

thereby, in accordance with the principle of mutual excluding between two poles of two magnets of identical polarity, said two annular magnets get therebetween a magnetic-levitating phenomenon and are provided therebetween with a space for movement, and hence said shock absorbing and magnetic levitating cushion gets an effect of shock absorbing.

2. The shock absorbing and magnetic levitating cushion as in claim 1, wherein material with a function of shock absorbing is filled in said hollow post of said magnetic conductive member.

3. The shock absorbing and magnetic levitating cushion as in claim 1, wherein said housing, said cover, said magnets and said sheet of said magnetic conductive member are all cylindrical.

4. The shock absorbing and magnetic levitating cushion as in claim 1, wherein said protrusion provided on said outer surface of said other end of said housing is filled therein with material of high specific weight, so that said magnetic levitating cushion functioning as a pedestal is more stable.

5. The shock absorbing and magnetic levitating cushion as in claim 1, wherein said audio-video equipment is a CD player of a DVD player.

* * * * *